Dec. 30, 1969  G. MARTENS ET AL  3,487,187
INDUCTIVELY HEATABLE GALETTE

Filed Aug. 13, 1968  2 Sheets-Sheet 1

INVENTORS:
GERHARD MARTENS
KARL BAUER
HERBERT TURK
HERBERT SCHIMINSKI

BY: Marzall, Johnston, Cook & Root
ATT'YS

Dec. 30, 1969  G. MARTENS ET AL  3,487,187
INDUCTIVELY HEATABLE GALETTE
Filed Aug. 13, 1968  2 Sheets-Sheet 2
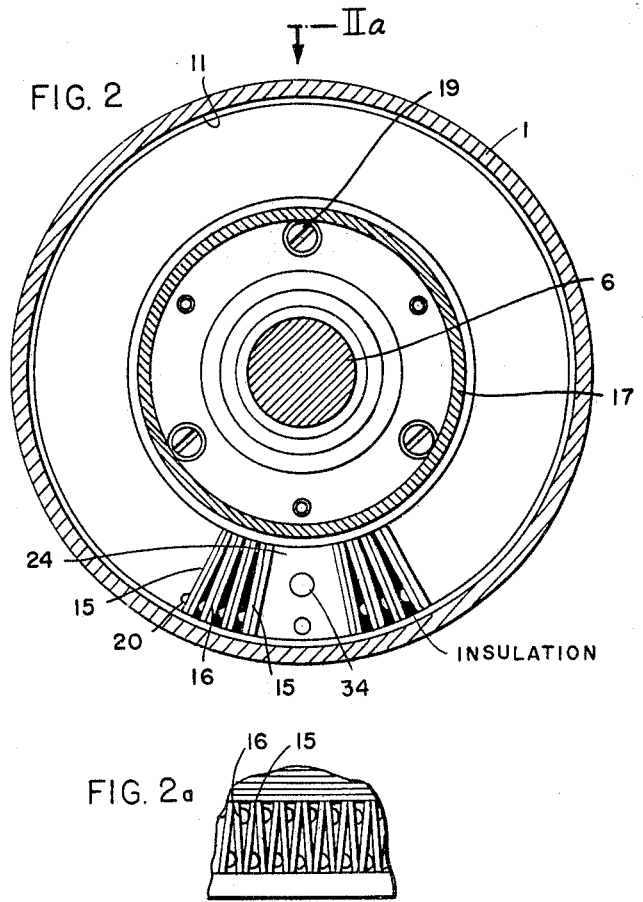
FIG. 2
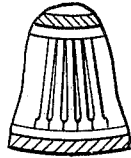
FIG. 2a
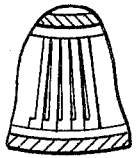 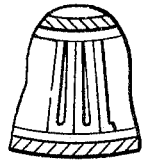 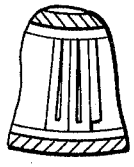
FIG. 2b   FIG. 2c   FIG. 2d   FIG. 2e
INVENTORS:
GERHARD MARTENS
KARL BAUER
HERBERT TURK
HERBERT SCHIMINSKI
BY: Marzall, Johnston, Cook & Root
ATT'YS United States Patent Office 3,487,187
Patented Dec. 30, 1969

3,487,187
INDUCTIVELY HEATABLE GALETTE
Gerhard Martens, Karl Bauer, Herbert Turk, and Herbert Schiminski, Remscheid-Lennep, Germany, assignors to Barmag Barmer Maschinenfabrik Aktiengesellschaft, Wuppertal, Germany
Filed Aug. 13, 1968, Ser. No. 752,397
Claims priority, application Germany, Aug. 16, 1967, B 93,997
Int. Cl. H05b 5/00, 9/06, 3/02
U.S. Cl. 219—10.61       14 Claims

ABSTRACT OF THE DISCLOSURE

Inductively heatable galette, characterized by an induction coil concentrically mounted in a stationary coaxial position within the rotatable jacket or shell of the galette and having a magnetic core member formed of a plurality of thin-walled plates of equal wall thickness positioned radially around substantially the entire galette axis of rotation and held in place by annular clamping means. The individual plates of the core are constructed in such a manner as to provide spaced leg members adapted to receive the windings of the coil therebetween, individual leg members bearing lateral projections at their outer ends as means of providing a substantially continuous or connected outer peripheral surface when the plates are assembled radially in contacting relationship along their outer and inner edges so as to form a substantially cylindrical or spool-shaped core.

---

It is known that a galette mounted for rotation on a stationary frame and adapted for the conveyance of synthetic threads of the like can be inductively heated by means of an induction heating element with its induction coil and core connected rigidly with the machine frame, and being surrounded coaxially by the galette shell or jacket which is seated firmly on a drive shaft, preferably at its outboard end or the end facing away from the mounting frame. Such galettes, which are generally of the flying storage type, are rollers or cylinders driven rotatably about their axis of rotation and are adapted to transport or convey a continuous thread, band or the like wound several times around the outer circumference of the galette, these galettes, rollers or cylinder being particularly useful in stretching and texturizing devices for the treatment of synthetic threads, filaments or yarns. Heated galettes also serve the function of conducting necessary heat to the particular goods being transported, for example for plastic deformation or fixation.

A number of galettes are known which are heated from the inside as well as from the outside, including such galettes in which the heat being delivered to the transported goods is capable of being regulated. Inductively heated galettes have already been described, for example in German Patent No. 1,025,095 as well as in British Patent No. 989,349 or its corresponding U.S. Patent No. 3,187,150. This latter patent discloses a magnetic core formed of laminations on which the coil is wound. In this case, the laminations are grouped together into a packet in which the individual lamination or plates are positioned in face-to-face contact with each other and extend parallel to the axis of rotation as well as being parallel with each other. Only the intermediate or middle lamination of the entire packet extend through the axis of rotation, being cut away to receive the drive shaft. At any given point of time, the magnetic flux in this device can be set up only in a narrowly circumscribed portion of the galette jacket corresponding to the width or thickness of the core element, i.e. in two oppositely disposed longitudinal arcuate segments of the cylindrical wall of the jacket, This construction therefore exhibits only a correspondingly slight degree of effectiveness for purposes of induction heating.

In addition to these relatively small axially supported rotating galettes, relatively large drying drums or transporting rollers have been disclosed in other technical areas of application, for example for the transport of paper webs and the like. These drums or rollers are supported on both sides and have an inductively heated shell or cylindrical wall, which in each case, by comparison, exhibits a multiple of the bearing surface lengths. (See, for example, U.S. Patent No. 2,273,423, and German Patents No. 1,151,724 and No. 1,237,239.) In these devices, the winding support or magnetic core element consists essentially of laminates with an L-shaped profile which in themselves taper with a wedge-shape and are arranged radially in packets lying axially one behind the other, such that two packets combined together form a U-shaped profile. However, this arrangement of laminates in a core has not been satisfactory in commercial practice, because it is extremely expensive to produce laminates or plates having the same tapering wedge shape. On the other hand, the winding support or core can obviously consist of laminations or plates of equal wall thickness which are arranged in layers in a plurality of planar parallel packets, some of which lie in a plane or planes extending through the middle or axis of the drum or roller shell, while the laminations of packets lying on either side of the central or radial laminations and adjacent to these in planar parallel relationship are positioned secantially with respect to the cylindrical shell. In this case, also, spaces or gaps are formed around the circumference of the winding support or core between the two outer plates of two adjacent plate packets, i.e. there are relatively large intermittent or circumferentially spaced gaps in the outer peripheral surface of the winding support when setting up the envelope of magnetic flux which must be developed in the roller shell surrounding the induction coil. Such spaces or gaps in the outer periphery of the core causes a variable intensity of the magnetic lines of force. Moreover, when carrying out a temperature regulation by switching on and off the alternating current supplied to the induction coil, these spaces or gaps cause temporary feedbacks capable of retarding or accelerating the rotation of the roller shell. The resulting temporary deviation in the rotational velocity of the roller is highly undesirable, particularly in the treatment of fine threads or filaments and especially when the filaments are in the freshly spun state. The results of such a temporary deviation in the rotational velocity of the roller can be readily observed in the structure of the threads or filaments, for example in their tensile strength or the dyeability of the thread structure.

By way of illustration, it has also been suggested as disclosed in British Patent No. 989,349, page 2, lines 64 ff., that one can use a solid cylindrical winding support or coil for the induction heating element. Experience has shown, however, that eddy currents are produced by such a magnetic core, and these in turn develop a considerable amount of heat in the core. As a result, a substantial amount of heat is not available for the direct heating of the rotating shell or jacket of the galette. Aside from the very inferior efficiency of this type of construction, the development and storage of heat in the interior of the galette jacket or shell causes additional disadvantages in terms of the longevity of the coil winding, the support and other important elements of the device. Moreover, this interior development of heat makes it almost impossible to obtain an exact measurement of the temperature for purposes of regulating the temperature of the galette jacket.

One object of the present invention is to provide an inductively heatable galette provided with an induction heating element constructed in such a manner as to avoid various problems now existing in this art. Another object of the invention is to provide an induction heating element for a heatable and rotatable galette wherein an induction coil can be produced from lamiations or plates having an equal wall thickness, thereby substantially reducing costs in the production of the core of the induction coil. Yet another object of the invention is to provide a highly efficient induction heating element for rotatable galettes, rollers or the like, especially as employed in the conveyance of synthetic threads, filaments or yarns. Still another object of the invention is to provide an inductively heatable galette with an induction coil capable of producing heat in the galette jacket or shell with maximum efficiency while avoiding interference with means for regulating the temperature of the galette jacket. These and other objects and advantages of the invention will become more apparent upon consideration of the following detailed disclosure.

It has now been found, in accordance with the present invention, that a substantial improvement can be achieved in an inductively heatable galette of the type in which the gallette jacket is a rotatable hollow cylindrical shell connected at its outer end to a rotatable drive shaft positioned on a supporting frame, the jacket coaxially enclosing an induction coil whose windings are carried on a core member mounted rigidly to the supporting frame at the inner end of the hollow shell, provided that the induction heating element comprises: a spool-shaped magnetic core member formed of a plurality of thin-walled plates of equal wall thickness positioned radially about the galette axis of rotation and held in place by annular clamping means. These individual plates have axially spaced leg members extending radially outwardly thereof so that the windings of the coil may be positioned between the legs and so that the outer faces or edge portions of the legs will terminate in close proximity to the inner surface of the hollow cylindrical shell. The radially positioned plates are placed in contacting relationship with one another and the legs of the plates are aligned so that the completely assembled core is formed in the shape of a cylinder with deep annular grooves between the assembled radially extending leg portions with the windings of the coil positioned in these grooves.

With adjacent radial plates in contacting relationship with each other, the inner circumferences of the core member is formed by the inner contacting edges of the plates to provide a substantially continuous inner core surface. The outercircumference of the core as defined by the leg members is completely by lateral projections or spacing elements integral with and positioned at the outer ends of individual leg members and arranged so as to place the outer edges of the leg members in contacting relationship, thereby providing a substantially continuous outer core surface with individual plates being separated from one another between their inner and outer edges.

By using individual plates or laminations having the same wall thickness, it is possible to achieve a cylindrical or spool-shaped core of the induction coil provided that the outer ends of the plate legs are formed with suitable projections or protuberances capable of acting as spacing members around the outermost circumference of the core as defined by the leg members. Adjacent plates or pairs of plates can thus be maintained in close contacting relationship along both the inner and outer edges of the core, while providing a narrow V-shaped spacing intermediate the inner and outer edges of the adjacent plates. It is particularly advantageous to fill these intermediate spaces between the plates with an insulating material, at least in the outer circumference of the core member.

The annular clamping means which hold the individual plates in their assembled contacting relationship can include profiled annular rings which are each mounted concentrically to engage correspondingly profiled edges of the plates at either end of the core member, together with means to tighteningly connect these profiled rings toward each other. Alternatively, the annular clamping means may include a cylindrical sleeve mounted concentrically along the inner circumferential surface of the core member with profiled flanges to engage correspondingly interfitting profiled edges of the plates at either end of the core member. In order to further facilitate the assembly of the plates into a spool-shaped core, it is also possible to provide one or more radial wedge-shaped fillers or spacing members composed of a non-magnetic material, these wedges merely serving to tighten the plates against each other in the circumferential direction of the core. Such wedges prevent a complete or continuous outer circumferential surface as formed by the legs of the core, but since they are quite small, they have only a negligible effect on the heating efficiency of the induction coil. Also, such wedges can serve as means for introducing the electrical lines for the induction winding. It is especially preferred, however, to construct the wedge-shaped fillers or spacers out of the same magnetic material as the core, and they may also function as one element of the annular clamping means.

The lateral projections or integral spacing members located at or adjacent the outer edges of individual plates can be formed in a number of different ways. For example, these projections can consist of beads or semi-spherical protuberances on the radially extending wall surface of the legs. If such beads at the ends of the plate legs are positioned eccentrically of the center line of the wall surface and alternate first to one side and then the other side of this center line in successively adjacent plates, then the cylindrical assembly of the plates and their legs results in a slight twisting of each leg as it is placed in contacting relationship along its outer circumference with the adjacent plate legs. In this case, the outer continuity of the circumferential surface formed by the plate legs is achieved at either side of the edge face of each plate leg. On the other hand, the projecting portions of the plate legs can be upset or formed at their outermost end by bending or angling the terminal end of the plate leg to one side or the other. Such bent edges can be arranged such that they all face in the same direction or they can be suitably staggered so that one opposes the other and maintains a contacting relationship between adjacent plates so as to achieve a substantially continuous outer circumferential surface as defined by the plate legs. A number of variations in these lateral projections are described more fully hereinbelow.

By constructing the core of the induction coil in accordance with the invention, there is achieved a spool-shaped magnetic core which consists entirely of radially directed plates of equal wall thickness. In comparison to known constructions, the induction heating element of the present invention represents the highest possible degree of efficiency with a considerable reduction in the cost of manufacturing the core. Thus, the alternating current flowing through the winding of the coil produces a strong and fully uniform magnetic flux in the galette jacket, a result which could not be effectively achieved in prior devices. The core losses in the winding support are very slight, it is practically impossible for eddy currents to occur, and the development of heat in the interior of the galette is thus effectively prevented. Also, when the inductively heatable galette is constructed in accordance with the invention, there is a greater economy and efficiency in its operation as well as a longer life time of the entire galette while offering a high degree of protection for easily damaged threads, filaments or the like being transported on the galette.

In general, it is desirable to provide an even surface temperature over the axial extension or outer circumferential surface of the galette jacket. For this purpose, it is frequently necessary to provide a certain division of the amount of heat in the longitudinal or axial direction of the galette, for example by providing a galette jacket having longitudinal or axial segments of different wall thicknesses. This difference in thickness is achieved simply by varying the inner diameter of the galette jacket. Since the air gap between the legs of the core plates and the galette jacket should be as small and uniform as possible, the plate legs can be formed with different radial lengths in conformance with the correspondingly different inner diameter of the galette jacket or hollow shell along axial portions thereof.

In order to further influence the amount of heat supplied to various longitudinal surface portions of the galette jacket or hollow shell, it is often advantageous for the plates to carry a plurality of at least three radially extending legs adapted to receive a plurality of at least two separate coil windings therebetween. The individual windings which lie between the legs can exhibit different winding numbers and, if desired, neighboring windings can be given opposite winding directions. By these measures, the axial forces effected on the galette and the galette axis can be effectively diminished. As still another means for influencing the amount of heat developed in the hollow shell or jacket of the galette, this shell can be lined over at least a portion of its length with a material having a good electrical conductivity, e.g. copper or brass. In this manner, it is possible to achieve a higher performance with a smaller magnetic flux.

In the accompanying drawing, several different embodiments of the invention are illustrated in partly schematic form with some elements or standard parts of the galette structure being identified by the same reference numerals in each of the figures. In these drawings:

FIG. 2 is an end view of the galette taken on line II—II of FIG. 1 so as to expose the arrangement of the plate legs of the magnetic core, most of these plates being omitted;

FIG. 2a is a partial view taken on the outer circumference of the core member looking radially inwardly on the arrangement of the plate legs;

Figure 1:
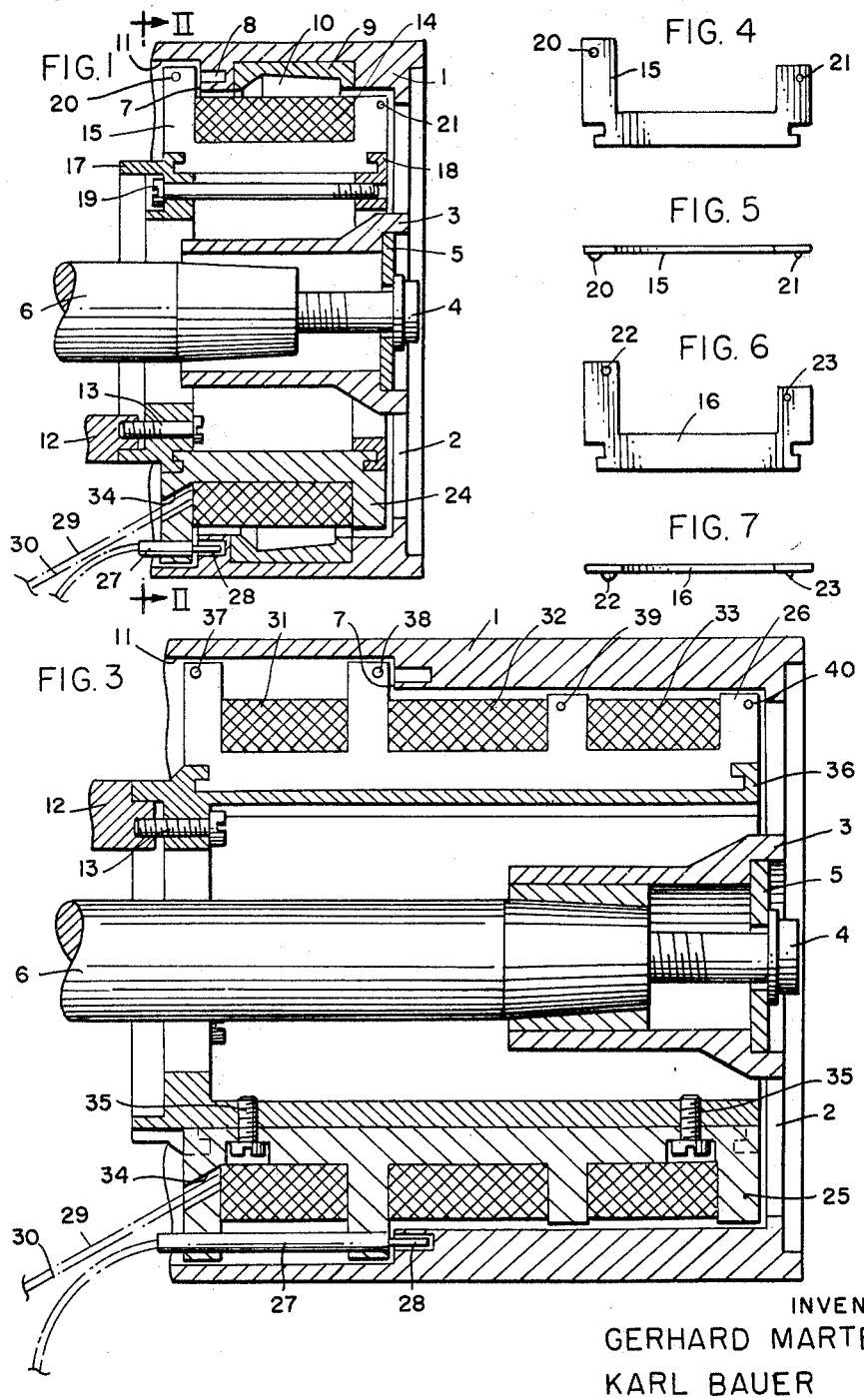
FIG. 1 is a cross-sectional view taken through the axis of rotation of a relatively short galette.

FIGS. 2b through 2e each represent a cut-away sectional view of the end of the galette similar to FIG. 2, but illustrating several different embodiments of the plate legs;

FIG. 3 is a cross-sectional view through the axis of rotation of a longer galette;

FIG. 4 is a side view of an individual plate of the core;

FIG. 5 is a plan or edge view of the same plate shown in FIG. 4;

FIG. 6 is a side view of a plate adjacent to that illustrated in FIGS. 4 and 5 with all of the plates being assembled as in FIGS. 2 and 2a; and FIG. 7 is a plan or edge view of the same plate shown in FIG. 6.

The galette illustrated in FIG. 1 of the drawings consists essentially of the galette jacket or shell 1 which is mounted for rotation at its outboard end through the radial spokes or vanes 2, which can be suitably formed as fan blades, onto the hub 3 whereby the galette is fastened by means of a bolt 4 and disc or plate 5 onto the drive shaft 6. In general, the galette jacket 1 will display a collar (not shown) on its inboard end, i.e., its left front side as shown in FIG. 1. The inner wall of the galette jacket 1 is offset stepwise with reference to the inner diameter of the galette at its left side or inboard end, the ring-shaped radial face 7 being provided with an annular groove or slot 8 adapted to receive a temperature gauge feeler 28. In addition, as shown in FIG. 1, a copper or brass bushing 9 can be lined along the inner wall of the galette jacket 1, and the inner circumference of this lining can exhibit a special irregular profile 10, these measures permitting a more even or uniform regulation of the heat over the surface of the galette. The sleeve or bushing 9 may also be wider than that illustrated, i.e., so as to extend backwardly to the face 7 with the annular groove 8 in the lining element itself. It is not absolutely necessary to employ a lining material having good electrical conductivity, such as copper or brass, since tests with other materials sprayed or welded as a lining onto the inner wall of the galette have also shown good results. For ease in construction, the outer diameter of the sleeve 9 or a coated layer on the inner wall of the galette can be identical to the inner diameter of the galette jacket at 11.

The induction coil for heating the galette is generally fastened by means of a screw or bolt 13 onto a supporting framework as indicated by the central supporting element 12, only a few bolts being required to rigidly fix the induction coil in a stationary position on the machine frame. The induction coil consists essentially of the actual coil winding 14 and a winding support or magnetic core made up of the plates 15, 16 (as also shown in FIGS. 4–7), the clamping rings 17 and 18 as well as the locking bolt 19 serving to fasten the entire coil together. A "360°-loading" of the galette jacket or shell with magnetic flux is achieved by a non-interrupted ring or circle of plates 15, 16 each of these plates having the same wall thickness. The assembly of the individual plates in alignment with each other to form a cylindrical or spool-shaped core can be readily accomplished when these plates are constructed in accordance with the present invention. The profiled clamping rings 17 and 18, which are separate elements and are only connected and braced or tensioned toward each other by the bolt 19, permit the assembly of a complete colar or ring of plates. By radially extending the plates in this manner substantially completely around the inner surface of the galette jacket, there is obtained the special advantage of a constantly strong magnetic flux longitudinally of the galette jacket circumference, i.e. without any substantial interruption in the lines of magnetic force at any given point of time over the entire periphery of the galette jacket. It can thus be emphasized that the construction and arrangement of the core plates in accordance with the invention results in a decrease in polarization and a prevention of disturbing feedbacks or reactive effects which may otherwise affect the uniform rotational speed of the galette.

At the inner diameter of the magnetic core formed by the assembly of the radially positioned plates, each of the individual plates is in direct contact with the adjacent plate on either side along its entire length or inner edge extending axially of the galette. At the outer diameter as formed by the plate legs, each of the projecting beads or protuberances 20 and 21 of a particular plate 15 rests against the smooth wall surface of the adjacent plate 16, and the beads 22 and 23 of plate 16 likewise rest against the smooth wall surface of the next adjacent plate which may again be designated as 15. Since the beads on two adjacent plates 15 and 16 are positioned eccentrically with reference to a center line of the wall surface of the plate leg, first to one side and then to the other side of this center line in successive plates, each plate leg is slightly twisted in the complete assembly as more fully shown in FIGS. 2 and 2a. When viewed radially inwardly as in FIG. 2a, the outermost edges or faces of the plates 15 and 16 follow a zig-zag continuous coherent planar course around substantially the entire outer circumference of the core as defined by the plate legs. At the same time, this outer circumferential surface of the core can be positioned so as to assure a constant air gap between the ends or outer edges of the plate legs and the inner surface of the galette jacket.

In this manner, a compact packet or spool of individual plates or laminations is formed as the magnetic core of the induction coil, the plates being held rigidly together particularly by means of the annular clamping rings 17 and 18 tightened toward each other by means of bolt or screw 19. It will be noted that one of these annular clamping rings 17 also serves as a ring-shaped mounting piece for the entire galette structure where it is attached to the machine frame 12. The magnetic core for the induction coil is therefore a practically solid rigid cylindrical body capable of being fastened firmly in a stationary position on the machine frame. The very small intermediate spaces or gaps which remain between the individual plates surprisingly have very little effect on the efficient operation of the induction coil, although it is preferable to fill these spaces with an electrically non-conducting insulation material, especially in the zone of the outer circumference of the plate legs. This insulation material is clearly indicated in the intermediate spaces between the plates in FIG. 2 of the drawings.

At one or more positions around the laminated magnetic core, a group or packet of several plates can be inserted by means of a wedge-shaped intermediate piece 24 (FIGS. 1 and 2), it also being possible to form these wedge members 24 in such a manner that they serve as the annular clamping means 25 as disclosed in FIG. 3. In this latter case, the wedge members 25 can be connected by means of screws 35 to an annular concentric sleeve 36. The profile of the intermediate wedges or spaces 24 or the clamping elements 25 is advantageously identical to the accompanying plates 15, 16 as shown in FIGS. 1 and 2 or identical to the plate 26 and its adjacent plate (not shown) in FIG. 3. Where these wedges or spacing members 24 are relatively thin and few in number, they can be made of a non-magnetic or insulating material without seriously affecting the operation of the induction heating element. However, from the viewpoint of functional efficiency, it is particularly desirable to construct the wedges 24 or clamping elements 25 of a magnetically good conducting material, e.g. iron. In this manner, substantially the entire outer peripheral surface of the core member provides an entry or exit path for the lines of magnetic flux into or from the galette jacket or shell where these lines of flux flow longitudinally in lines parallel to the axis of rotation of the galette and without any substantial gaps in these lines of force around the circumference of the galette jacket.

The electrical lead lines 29 and 30 of the core winding 14 (FIG. 1) or the winding 31, 32 and 33 (FIG. 3) can be conducted through the bore 34 of the wedge-shaped spacer 24 (FIG. 1) or the clamping element 25 (FIG. 3). The wedge-shaped elements 24 and 25 also function in the assembly by exerting a force in circular direction of the circumference so as to have a wedging effect on the plate packets arranged between these wedging elements. In other words, all of the individual plates are pressed firmly together in the circumferential direction, so that even when beads are eccentrically arranged on the plate legs, as in FIGS. 4-7, sufficient force is placed on the plat legs to twist them so that their outer faces or edges present a closed surface path or course as indicated in FIG. 2a. This result is achieved as shown in FIG. 3, because the clamping and wedging element 25 is moved or pulled radially into alignment on the plate sleeve carrier 36 by means of screws 35. The beads 37, 38, 39 and 40 of the plate 26 are thus shifted or forced over against the next adjacent plate (not shown in FIG. 3), and this same action occurs in each successive plate so that the individual plate legs are slightly twisted when completely wedged in place.

A number of other embodiments of the individual plates are illustrated in FIGS. 2b through 2e, wherein the plate legs are shaped at their outer ends or edges corresponding to the circumferential extension of the winding support or core, such that lateral projections are provided which touch one another along their entire length, corresponding to the width of the core, and thus provide a continuous surface on the entire circumference of the core. As shown in FIG. 2b, the plate legs can be upset or headed at their outer ends or edges, or as shown in FIGS. 2c and 2d, these outer edges can be beveled or bent to one side or the other such that the projecting bent portions or bevels are arranged facing the same direction or in pairs facing toward each other in successive plates around the circumference of the core. Another slight variation is shown in FIG. 2e where the bent or deformed lateral projection along the outer ledge of every second plate extends over a distance corresponding to the radial projection of two plates, a somewhat shorter and non-deformed plate being arranged between and in contact with those plates having a projection. In all cases, the function of these beads or lateral projections is to space and position the individual plates having the same thickness into well-defined radial positions in forming the spool-shaped magnetic core, while still providing a substantially continuous surface extending around the entire outer circumference of the core.

The electrical current flowing through the winding 14 develops a magnetic flux in the plates 15, 16 or 26 and in the galette jacket 1. Depending upon the particular direction of flow of the electrical current, the magnetic flux extends outwardly through one of the plate legs, runs through the galette jacket 1 and then reenters the core at the free end of the next leg of the core. The alternating magnetic flux develops heat in the galette jacket. By comparison, only a very slight amount of heat is developed in the plates themselves.

In earlier experiments, it had been established that the heat on the left or inboard side of the galette jacket discharges or radiates relatively easily, so that the temperature at this point on the surface of the galette was often too low for proper thread treatment. By increasing the inner diameter of the gelatte jacket at this point in a stepwise manner, a concentration of the magnetic flux can be achieved in the narrower cross-section so as to locally develop a greater amount of heat. The corresponding left plate leg is thus lengthened in such a manner that the air gap between the end of the leg and the inner surface of the galette jacket is as narrow as possible. Such variations in the wall thickness of the galette jacket should normally be made so as to provide localized temperature increases or decreases as a means of compensating for an otherwise non-uniform heating of the galette jacket surface. The lining or coating 9 on the inner wall of the galette jacket makes it possible to achieve a greater output of heat with a smaller magnetic flux. Depending upon the shape of the profile 10 of the lining 9, it is possible to influence the temperature along the galette jacket, local reductions in the size of the cross-section of this lining resulting in a corresponding increase in the amount of heat developed in the wall of the galette jacket.

Another means of influencing the heat distribution in the galette is achieved by using two or more windings at axially adjacent positions and by choosing a different winding number according to predetermined values of magnetic flux. Tests have further proven that at those points where the magnetic fluxes coincide in opposition to each other, an especially large amount of heat can be developed in the galette jacket. Thus, in the galette according to FIG. 3, the jacket circumference over the leg between the windings 31 and 32 can be fixed at a higher temperature by winding the two coils 31 and 32 in opposite directions and by connecting them to a common alternating current source.

A continuously uniform and high thread quality can only be obtained if the temperature of the galette jacket is carefully controlled and regulated. The temperature measurement and the transfer of this measurement to a regulator which can be conveniently mounted externally of the galette on the machine frame 12 is thus of special importance. However, this temperature regulation does not constitute an element of the present invention other than the fact that it is especially advantageous to position a temperature feeler gauge directly in the wall of the cylindrical jacket of the galette so that the energizing of the induction coil can be made closely responsive to the temperature on the galette surface. Thus, the base 27 of the temperature feeler gauge can be mounted in the wedge-shaped bridging or spacing elements 24 (FIG. 1) or the wedging and clamping elements 25 (FIG. 3) while the feeler element 28 of the temperature gauge extends into the annular slot 8. The best results are achieved if the annular groove and feeler are arranged in the central or middle portion of the axial length of the galette jacket. Thus, by recessing or boring out the galette jacket or shell, the ring-shaped facing surface 7 can be extended into the middle portion of the elongated galette as shown in FIG. 3, the feeler of the temperature gauge thereby lying at that point in the cross-section of the jacket wall where for technical processing reasons, it is especially desirable to maintain a constant temperature. The particular arrangement and construction of the induction coil and other elements of the galette in accordance with the present invention are especially advantageous in that a large number of alternatives are provided for accurately designing the galette in such a manner as to provide a highly uniform heating and temperature regulation during the transporting of threads, yarns, bands or the like. In addition, the particular construction of the magnetic core of the induction heating element is not only relatively inexpensive but provides the maximum efficiency in terms of a maximum uniform development of heat while avoiding undesirable influences on the operation of the galette.

The invention is hereby claimed as follows:

1. In an inductively heatable galette in which the galette jacket is a rotatable hollow cylindrical shell connected at its outer end to a rotatable drive shaft positioned on a supporting frame, said jacket coaxially enclosing an induction coil whose windings are carried on a core member mounted rigidly to said supporting frame at the inner end of said hollow shell, the improvement of an induction heating element comprising a spool-shaped magnetic core member formed of a plurality of thin-walled plates of equal wall thickness positioned radially about the galette axis of rotation and held in place by annular clamping means, said plates having axially spaced leg members extending radially outwardly thereof with the windings of said coil positioned between said legs and the outer faces of said legs terminating in close proximity to the inner surface of said hollow cylindrical shell, the inner circumference of said core member being formed by the inner contacting edges of said plates to provide a substantially continuous inner core surface and the outer circumference of said core as defined by said leg members being formed by lateral projections at the outer ends of individual leg members arranged to place the outer edges of said leg members in contacting relationship, thereby providing a substantially continuous outer core surface with individual plates being separated from one another between their inner and outer edges.

2. An inductively heatable galette as claimed in claim 1 wherein said annular clamping means include profiled annular rings mounted concentrically to engage correspondingy profiled edges of the plates at either end of said core member, and means to tighteningly connect said profiled rings toward each other.

3. An inductively heatable galette as claimed in claim 1 wherein said annular clamping means includes a cylindrical sleeve mounted concentrically along the inner circumferential surface of said core member with profiled flanges to engage correspondingly interfitting profiled edges of the plates at either end of said core member.

4. An inductively heatable galette as claimed in claim 1 wherein the plate leg projections are formed as beads on the radially extending wall surface of the legs.

5. An inductively heatable galette as claimed in claim 4 wherein said beads at the ends of the plate legs are positioned eccentrically of the center line of said wall surface and alternate first to one side and then to the other side of said center line in successively adjacent plates.

6. An inductively heatable galette as claimed in claim 1 wherein the intermediate spaces between each of the adjacent plates are filled with an insulating material in at least the outer circumference of the core member.

7. An inductively heatable gelette as claimed in claim 1 wherein the plate legs extend radially to different lengths in conformance with a correspondingly different inner diameter of said galette hollow shell along axial portions thereof.

8. An inductively heatable galette as claimed in claim 1 wherein said plates carry a plurality of at least three radially extending legs adapted to receive a plurality of at least two separate coil windings therebetween.

9. An inductively heatable galette as claimed in claim 8 wherein said separate windings have different winding numbers.

10. An inductively heatable galette as claimed in claim 8 wherein adjacent windings have opposite winding directions.

11. An inductively heatable galette as claimed in claim 1 wherein the inner wall of the galette hollow shell is lined over at least a portion of its length with a material of good electrical conductivity.

12. An inductively heatable galette as claimed in claim 1 wherein said thin-walled plates are pressed together circumferentially by at least one wedge-shaped spacer plate having approximately the same profile as said thin-walled plates.

13. An inductively heatable galette as claimed in claim 12 wherein said at least one wedge-shaped spacer plate is composed of the same magnetizable material as that of the thin-walled plates.

14. An inductively heatable galette as claimed in claim 13 wherein said at least one wedge-shaped spacer plate is connected to said annular clamping means.

References Cited

UNITED STATES PATENTS 2,273,423  2/1942  Somes _____ 219—10.49
3,187,150  6/1965  France _____ 219—10.61 X JOSEPH V. TRUHE, Primary Examiner L. H. BENDER, Assistant Examiner U.S. Cl. X.R.

219—10.57, 469